United States Patent [19]

Page

[11] Patent Number: 4,543,798
[45] Date of Patent: Oct. 1, 1985

[54] TOOL CARRIER WITH REFRIGERATION COMPARTMENT

[76] Inventor: Daniel A. Page, Rte. 13, Hwy. 127 North, Crossville, Tenn. 38555

[21] Appl. No.: 600,036

[22] Filed: Apr. 13, 1984

[51] Int. Cl.⁴ .............................................. F25D 3/08
[52] U.S. Cl. ...................................... 62/239; 62/454; 62/457; 220/20; 220/412
[58] Field of Search ............... 62/457, 451, 454, 458, 62/239; 220/412, 20

[56] References Cited

U.S. PATENT DOCUMENTS

| | | | |
|---|---|---|---|
| 2,356,778 | 8/1944 | Morrison | 62/451 |
| 2,511,648 | 6/1950 | Milholland | 62/457 |
| 3,410,109 | 11/1968 | Maryland | 62/457 |
| 3,605,431 | 9/1971 | Carson | 62/457 X |
| 3,640,423 | 2/1972 | Parker | 220/324 |
| 3,916,639 | 11/1975 | Atkinson | 62/239 |
| 3,959,982 | 6/1976 | Denis et al. | 62/457 X |
| 4,213,309 | 7/1980 | Pifer | 62/457 X |

Primary Examiner—William E. Tapolcai
Attorney, Agent, or Firm—Pitts and Brittian

[57] ABSTRACT

An improved tool carrier with refrigeration compartment for mounting across the bed of a pickup truck. The carrier (10) includes an enclosure (16) comprising forward and rearward side walls (18 and 20, respectively), and opposite end walls (20 and 24), and a bottom portion (26). The enclosure (12) is divided into a refrigeration housing (28) and a tool compartment (30) with a partition (32). Further, means are provided for releasably mounting the carrier (10) across the bed of a pickup truck (14). The carrier (10) further comprises a refrigeration unit (70) slidably received within the refrigerator housing (28), the refrigeration unit (70) defining a refrigeration compartment (71) for carrying items to be refrigerated. A door assembly is also provided for selectively accessing either the refrigerator housing (28) or the tool compartment (30).

16 Claims, 3 Drawing Figures

TOOL CARRIER WITH REFRIGERATION COMPARTMENT

TECHNICAL FIELD

This invention relates to an improved tool carrier with refrigeration compartment for mounting across the bed of a pickup truck to facilitate the carrying of tools, hardware, parts, etc. to a job site, as well as food items and other items or substances requiring refrigeration or for which refrigeration is desirable.

BACKGROUND ART

Tool boxes for mounting across or in the beds of pickup trucks are commonly used to facilitate the carrying of tools. For example, U.S. Pat. No. 3,640,423 issued Feb. 8, 1972, discloses such a tool box, featuring a pivoting cover with cooperating latch means. It will be appreciated that various other similar tool boxes are presently in use. However, in addition to carrying tools to a job site, it is often desirable to carry food and refreshment such that work in a remote area is not unduly delayed or disrupted by reason of lunch or refreshment breaks. Thus, it is desirable to have a refrigeration unit present at the job site such that food and refreshments may be maintained at the desired, or required, temperature. Further, it may be desirable or necessary to refrigerate certain items or substances used in the work being performed, such as chemicals and medicines. However, the tool boxes presently known in the art do not offer the convenience of a refrigeration compartment, thus, other arrangements must be made where refrigeration facilities are necessary or desirable. In that regard, various portable refrigeration units are known in the art, such as those disclosed in U S. Pat. No. 6,850,006, issued Nov. 26, 1974; U.S. Pat. No. 3,858,405, issued Jan. 7, 1975; and U.S. Pat. No. 4,103,510, issued Aug. 1, 1978. However, none of these portable coolers are adapted to be releasably secured in or across the bed of a truck, and none provide the convenience of having an integrated unit providing storage facilities, tool carrying facilities, and refrigeration facilities.

Accordingly, it is an object of the present invention to provide a tool carrier with a refrigeration compartment for mounting across the bed of a pickup truck.

It is another object of the present invention to provide a tool carrier with a refrigeration unit which uses a truck's electrical system as a power source.

Yet another object of the present invention is to provide a tool carrier with a refrigeration unit which is removable such that the unit may be easily repaired and serviced, and such that the refrigeration housing may be used for other purposes.

It is another object of the present invention to provide a tool carrier with refrigeration compartment which is inexpensive to manufacture and maintain.

DISCLOSURE OF THE INVENTION

Other objects and advantages will be accomplished by the present invention which provides an improved tool carrier with refrigeration compartment capable of being releasably mounted across the bed of a pickup truck. The carrier generally includes an enclosure comprising forward and rearward side walls, oppositely disposed end walls and a bottom portion, and further comprising a partition dividing the enclosure so as to define a refrigerator housing and a tool compartment. Means are provided for releasably securing the enclosure proximate the oppositely disposed end walls to a pickup truck such that the enclosure is mounted across the bed of the truck. A refrigeration unit is slidably received in the refrigerator housing of the enclosure with a wiring harness being provided for connecting the refrigeration unit to the electrical system of the pickup truck. Further, a door assembly is provided including a first door panel for accessing the refrigerator housing and thus the refrigerator unit, and a second door panel is provided for accessing the tool compartment.

BRIEF DESCRIPTION OF THE DRAWINGS

The above-mentioned features of the invention will become more clearly understood from the following detailed description of the invention read together with the drawings in which:

FIG. 3 is an alternate embodiment, in section, of a portion of a door panel of the tool carrier of the present invention.

BEST MODE FOR CARRYING OUT THE INVENTION

Figure 1:
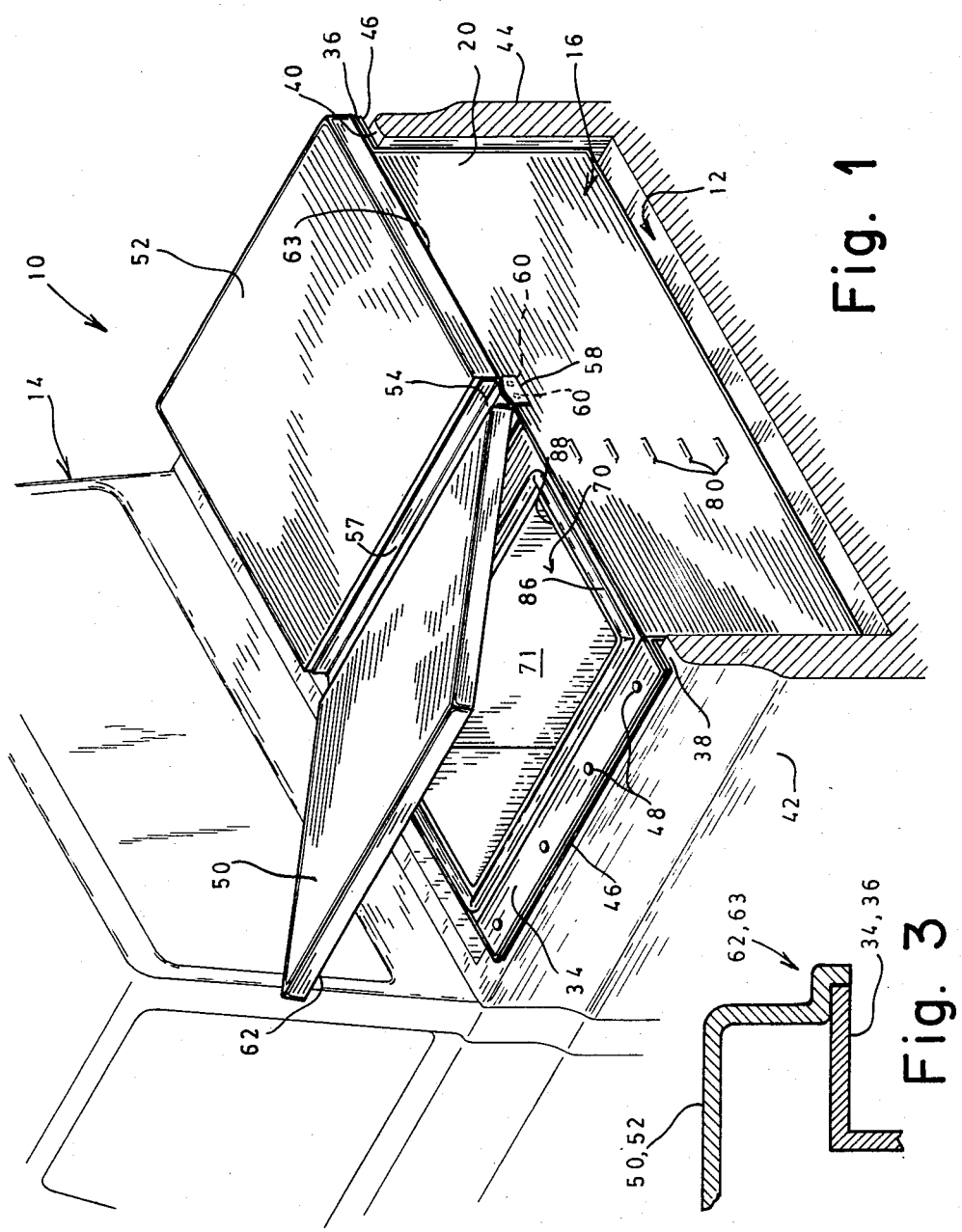
FIG. 1 illustrates a perspective view of the tool carrier of the present invention as it is mounted on a pickup truck.
Figure 2:
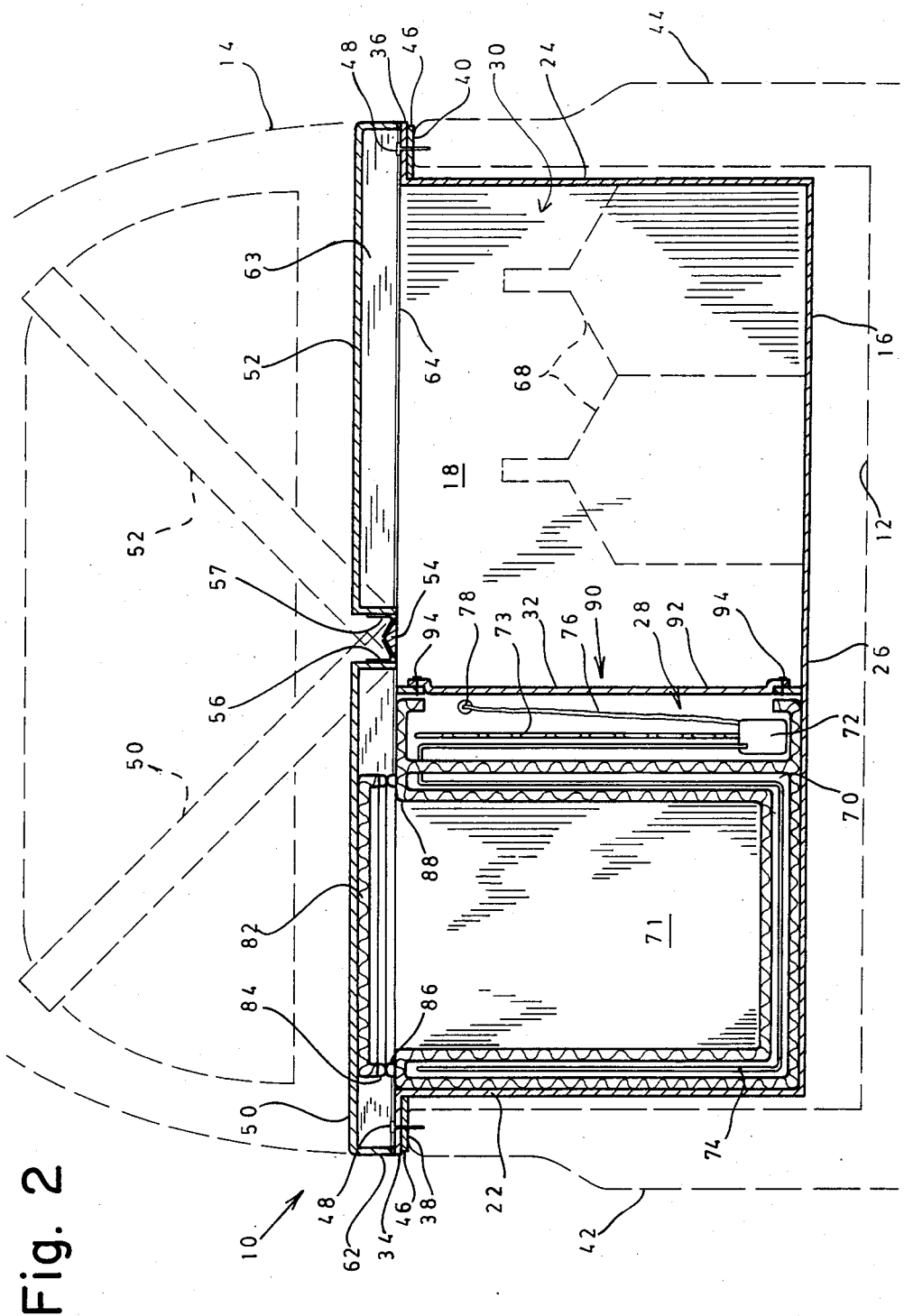
FIG. 2 illustrates a rear elevation view, partially in section, of the tool carrier of the present invention as it is mounted on a pickup truck.

An improved tool carrier with a refrigeration compartment incorporating various features of the present invention is illustrated generally at 10 in the figures. The carrier 10 is designed for being releasably mounted across the bed 12 of a pickup truck 14 for carrying tools, parts, hardware items, etc., and for carrying food, or other items or substances requiring refrigeration, to a job site. The carrier 10 includes an enclosure 16 comprising forward and rearward side walls 18 and 20, respectively, opposite end walls 22 and 24, and a bottom portion 26. The enclosure 12 is divided into a refrigeration housing 28 and a tool compartment 30 with the partition 32, the partition 32 being aligned substantially parallel to the end walls 22 and 24. Preferably, the enclosure 12 is fabricated of aluminum or another light durable metal. However, a durable plastic, fiberglass, or other durable material can be used.

The upper portion of the end walls 22 and 24 of the enclosure 12 are integrally provided with outwardly extending horizontal flange portions 34 and 36 for releasably supporting the carrier 12 on the truck 14. More specifically, the flange portions 34 and 36, and thus the carrier 10, are supported on the upper surfaces 38 and 40 of the truck side walls 42 and 44, respectively, with cushion members 46 being inserted between the flange portions 34 and 36. The cushion members 46 serve as shock absorbers between the flange portions 34 and 36 and the upper surfaces 38 and 40, respectively, resultantly protecting the engaging surfaces of each from damage caused from such surfaces coming together. The cushion members 46 are preferably fabricated of a rubber or rubber like substance having the desired shock absorbing qualities. Further, the flange portions 34 and 36 are releasably secured to the upper surfaces 38 and 40 of the truck side walls 42 and 44, with a plurality of bolts 48. It will be appreciated that various fastening means may be used to secure the flange portions 34 and 36 to the surfaces 32 and 34 and that the bolts 48 are merely illustrative of one preferred means.

It will be noted that as the carrier 10 is mounted on the truck 14, the carrier 10 engages the truck 14 only at flange portions 34 and 36, and the carrier 10 is otherwise suspended across the bed of the truck 14 with all other exterior surfaces of the enclosure 10 being spaced a preselected distance from the exterior surfaces of the truck 14. This spacing of the carrier 10 from the exterior of the truck 14 ensures that there will be no damage to either the carrier 10 or the truck 14 by reason of their exterior surfaces striking or rubbing together during operation of the truck 14.

The carrier 10 further comprises a pair of door panels 50 and 52 pivotally mounted on a center support 54 with piano hinges 56 and 57, respectively. Thus, the door panel 50 selectively accesses the refrigerator housing 28 and the door panel 52 selectively accesses the tool compartment 30. The center support 54 is provided at its opposite end portions with downwardly extending retainer flanges 58 which closely engage the upper exterior surface of the forward and rearward side walls 18 and 20 so as to hold the center support 54 in place as it spans the enclosure 16. It will be appreciated that the center support 54 can be secured to the side walls 18 and 20 with fasteners 60 (shown in phantom lines) or can be left unsecured such that the center support 54, and the door panels 50 and 52, can be easily removed if and when desired and such that the center support 54 is allowed to slide the length of the carrier so that the door panels 50 and 52 can be moved to one side to give better access to a given side of the enclosure. Further, it will be noted that the lower edge portion 62 and 63 of the door panels 50 and 52, respectively, engage the upper edge portion of the side walls 18 and 20 and the upper surfaces of the flange portions 34 and 36. To ensure the water tight integrity of the carrier 10, a seal member 64 is provided on the lower edge portions 62 and 63 of the door panels 50 and 52. Alternately, as illustrated in FIG. 3, the lower edge portions 62 and 63, can be provided with an overlapping rim 66 which overlaps the side walls 18 and 20 and the flange portions 34 and 36 to prohibit precipitation into the carrier 10.

As indicated above, the enclosure 16 defines a tool compartment 30 and a refrigerator housing 28. The tool compartment 30 is used for housing tools, hardware, etc. In one embodiment, the tool compartment 30 is provided with tool trays 68 to facilitate the organization of tools within the carrier and to facilitate the removal of tools from the compartment 30. The refrigerator housing 28 houses a DC refrigeration unit 70 defining a refrigeration compartment 71, the refrigeration unit comprising conventional components including a compressor 72, a condenser 73, and an evaporator 74. Electrical power is supplied to the refrigeration unit 70 through a wiring harness 76, which is routed through a hole 78 in the forward side wall 18 of the enclosure 16 and connected to the electrical system of the truck 14. Further, a plurality of vents 80 are provided in the forward side wall 18 and the rearward side wall 20 proximate the condenser 73 such that the heat dissipated by the condenser 73 is allowed to escape from the enclosure 16.

In order to properly seal the refrigeration compartment 71 such that the desired temperature is maintained, the door panel 50 is provided with a secondary closure 82 provided with a seal member 84 which sealably engages a corresponding seal member 86 mounted around the upper rim 88 of the refrigeration compartment 71 when the door panel 52 is closed.

It will be appreciated that the refrigeration unit 70 is slidably received in the refrigerator housing 28 and can thus be lifted out of the housing 28 for repairs or servicing. However, in order to provide limited access to certain components of the unit 70 for minor sevicing or repairs, the partition 32 is provided with an opening 90 selectively covered with a removable panel 92. In the illustrated embodiment, the panel 92 is secured with a plurality of screws 94, but various other fastening means can be used to secure the panel 92 in a closed position.

Thus, it will be appreciated that an improved tool carrier with a refrigeration compartment for being removably mounted on a pickup truck has been described and illustrated. The improved carrier 10 facilitates not only the carrying of tools, parts, and other hardware to a job site, but also provides a refrigeration unit for carrying food items and various other items and substances requiring refrigeration. Further, the refrigeration unit is removable for easy maintenance and servicing, and such that the refrigeration housing can be used for other purposes if desired.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An improved tool carrier for being mounted proximate the bed of a truck for carrying tools and for carrying various items to be refrigerated, comprising:
   and enclosure comprising forward and rearward side walls, oppositely disposed end walls, and a bottom portion, and comprising a partition dividing said enclosure so as to define a tool compartment and a refrigerator housing, said enclosure further comprising means for releasably securing said carrier to said truck;
   a refrigeration unit received within said refrigerator housing, said refrigeration unit defining refrigeration compartment and comprising an upper rim portion provided with a first seal member; and
   a door assembly comprising a first door panel pivotally secured to said enclosure for accessing said refrigeration housing and a second door panel pivotally secured to said enclosure for accessing said tool compartment, said first door panel being provided with a second seal member for sealably engaging said first seal member of said refrigeration unit when said first door panel is in a closed position so as to seal said refrigeration compartment.

2. The improved tool carrier of claim 1 wherein said means for releaseably securing said carrier to said truck comprises at least one flange portion extending outwardly from each said oppositely disposed end wall for engaging said truck, said flange portion being provided with suitable fastening means for securing said flange portion to said truck.

3. The improved tool carrier of claim 2 wherein said fastening means for securing said flange portions to said truck comprise a plurality of bolts received in corresponding holes in said truck.

4. The improved tool carrier of claim 2 wherein each said flange portion is provided with a cushion member, said cushion members being received between said flange portion and said truck to serve as shock absorber between said carrier and said truck.

5. The improved tool carrier of claim 3 wherein said means for releasably securing said carrier to said truck comprises at least one flange portion extending outwardly from each said oppositely disposed end wall for engaging said truck, said flange portion being provided with suitable fastening means for securing said flange portion to said truck.

6. The improved tool carrier of claim 5 wherein said fastening means for securing said flange portions to said truck comprise a plurality of bolts received in corresponding holes in said truck.

7. The improved tool carrier of claim 5 wherein each said flange portion is provided with a cushion member, said cushion members being received between said flange portion and said truck to serve as shock absorber between said carrier and said truck.

8. An improved tool carrier for being mounted proximate the bed of a truck for carrying tools and for carrying various items to be refrigerated, comprising:
   an enclosure comprising forward and rearward side walls, oppositely disposed end walls, and a bottom portion, and comprising a partition dividing said enclosure so as to define a tool compartment and a refrigerator housing, said enclosure further comprising means for releasably securing said carrier to said truck, said housing being provided with at least one vent for venting heated air from said housing;
   a refrigeration unit removably received within said refrigerator housing, said refrigeration unit defining a refrigeration compartment comprising an upper rim portion provided with a first seal member; and
   a door assembly comprising first and second door panels, and a center support, said first door panel being pivotally secured to center support for accessing said refrigeration housing and said second door panel being pivotally secured to said center support for accessing said tool compartment, said first door panel being provided with a secondary closure, said closure including a second seal member for sealably engaging said first seal member of said refrigeration unit when said first door panel is in a closed postion so as to seal said refrigeration compartment.

9. The improved tool carrier of claim 8 wherein said refrigeration unit is provided with a wiring harness for carrying electrical power to said refrigeration unit.

10. The improved tool carrier of claim 8 wherein said first and second door panels are each pivotally secured to said center support with a piano hinge.

11. The improved tool carrier of claim 8 wherein said center support comprises opposite end portions provided with retainer flanges for closely engaging said side walls of said enclosure so as to hold said center support in place such that said center support slidably spans said enclosure.

12. An improved tool carrier for being mounted across the bed of a pickup truck for carrying tools and for carrying various items requiring refrigeration, comprising:
   an enclosure comprising forward and rearward side walls, oppositely disposed end walls and a bottom portion, said enclosure further comprising a partition dividing said enclosure so as to define a refrigerator housing and a tool compartment, said oppositely disposed end walls being provided with upper end portions comprising outwardly extending flange portions for engaging said truck so as to support said carrier, with suitable fastening means being provided for securing said flange portions to said truck, said refrigerator housing being provided with a plurality of vents for venting heated air from said housing;
   a refrigeration unit received in said refrigerator housing of said enclosure, said refrigeration unit defining a refrigeration compartment for carrying said items to be refrigerated, said refrigeration unit being provided with a wiring harness for carrying electrical power to said refrigeration unit, said refrigeration unit further comprising an upper rim portion provided with a first seal member; and
   a door assembly comprising first and second door panels, and a center support, said first door panel being pivotally secured to said center support for accessing said refrigerator housing and said second door panel being pivotally secured to said center support for accessing said tool compartment, said first door panel being provided with a secondary closure, said closure including a second seal member for sealably engaging said first seal member of said refrigeration unit when said first door panel is in a closed position so as to seal said refrigeration compartment.

13. The improved tool carrier of claim 12 wherein said fastening means for releasably securing said flange portions to said truck comprise a plurality of bolts received in corresponding holes in said truck.

14. The improved tool carrier of claim 12 wherein each said flange portion is provided with a cushion member, said cushion member being received between said flange portion and said truck to serve as a shock absorber between said carrier and said truck.

15. The improved tool carrier of claim 12 wherein said first and second door panels are each pivotally secured to said center support with a piano hinge.

16. The improved tool carrier of claim 12 wherein said center support comprises opposite end portions provided with retainer flanges which closely engage said side walls of said enclosure, so as to hold said center support in place such that it slidably spans said enclosure.

* * * * *